(12) United States Patent
Wang

(10) Patent No.: US 9,822,723 B2
(45) Date of Patent: Nov. 21, 2017

(54) FUEL LEVEL SENSOR DIAGNOSIS DEVICE

(71) Applicant: DENSO CORPORATION, Kariya, Aichi-pref. (JP)

(72) Inventor: Bin Wang, Kariya (JP)

(73) Assignee: DENSO CORPORATION, Kariya (JP)

( * ) Notice: Subject to any disclaimer, the term of this patent is extended or adjusted under 35 U.S.C. 154(b) by 108 days.

(21) Appl. No.: 15/058,248

(22) Filed: Mar. 2, 2016

(65) Prior Publication Data

US 2016/0258377 A1 Sep. 8, 2016

(30) Foreign Application Priority Data

Mar. 4, 2015 (JP) .................................. 2015-042343
Feb. 23, 2016 (JP) .................................. 2016-031841

(51) Int. Cl.
| G01F 23/00 | (2006.01) |
| F02D 41/22 | (2006.01) |
| B60K 15/06 | (2006.01) |
| F02D 33/00 | (2006.01) |
| G01F 25/00 | (2006.01) |
| B60K 15/03 | (2006.01) |

(52) U.S. Cl.
CPC .......... *F02D 41/222* (2013.01); *B60K 15/061* (2013.01); *F02D 33/003* (2013.01); *G01F 23/00* (2013.01); *G01F 23/0061* (2013.01); *G01F 25/0061* (2013.01); *B60K 2015/0319* (2013.01); *B60K 2015/03217* (2013.01); *B60Y 2306/13* (2013.01); *B60Y 2306/15* (2013.01); *B60Y 2400/3019* (2013.01); *F02D 2041/224* (2013.01); *Y02T 10/40* (2013.01)

(58) Field of Classification Search
CPC .. F02D 41/222; F02D 2041/224; Y02T 10/40; F02B 77/08
USPC ......................................... 73/114.52, 114.54
See application file for complete search history.

(56) References Cited

FOREIGN PATENT DOCUMENTS

| JP | 2006220109 | * | 8/2006 |
| JP | 2007-010574 A | | 1/2007 |
| JP | 2014-009597 A | | 1/2014 |
| JP | 2015-021452 A | | 2/2015 |
| WO | 2014-021136 A1 | | 6/2014 |

OTHER PUBLICATIONS

English machine translation for JP 2014009597.*

* cited by examiner

*Primary Examiner* — Daniel S Larkin
*Assistant Examiner* — Anthony W Megna Fuentes
(74) *Attorney, Agent, or Firm* — Posz Law Group, PLC

(57) ABSTRACT

A fuel level sensor detects the level of fuel in a fuel tank. A level signal detected by a float does not change in a full dead zone and an empty dead zone. During normal fuel consumption, the level signal changes according to the consumption amount. Thus when an electronic control unit, or ECU, detects that the fuel level sensor is operating normally, the ECU resets a fuel consumption amount. However, when a small quantity of fuel is supplied, the fuel consumption amount is not reset, and a measurement error may occur during failure detection. Accordingly, the ECU corrects a failure threshold value to avoid misdiagnosing a failure.

6 Claims, 13 Drawing Sheets

FUEL LEVEL SENSOR DIAGNOSIS DEVICE

CROSS REFERENCE TO RELATED APPLICATION

The present application is based on Japanese Patent Application No. 2015-42343 filed on Mar. 4, 2015, and Japanese Patent Application No. 2016-31841 filed on Feb. 23, 2016, disclosure of which is incorporated herein by reference.

TECHNICAL FIELD

The present disclosure relates to a fuel level sensor diagnosis device.

BACKGROUND

Fuel level sensors are used to detect the amount of stored fuel remaining in a fuel tank, and may perform this detection in a variety of manners. However, if a fuel level sensor does not operate normally, refuel timings may be missed. Accordingly, when a fuel level sensor fails, the fuel sensor must be promptly repaired or the like.

In one technique for diagnosing a failure in a fuel level sensor, the fuel level sensor is determined to be faulty if a change in the output of the fuel level sensor does not exceed a predetermined value when a predetermined amount of fuel is consumed.

In certain cases, when the fuel level sensor detects the movement of a float that floats in the fuel inside the tank, there are dead zones when the tank is full or empty. In these dead zones, the output of the fuel level sensor does not change according to the remaining amount of fuel.

If the tank is repeatedly refueled with smalls amount of fuel in these dead zones or an intermediate region such that the change amount in the fuel level sensor output does not exceed the predetermined value, the cumulative amount of consumed fuel may exceed the failure threshold before the fuel level sensor outputs the predetermined amount of change. In this case, even if the fuel level sensor is operating normally, the fuel level sensor may be determined to be faulty. Refer to, for example, JP 2007-010574 A and JP 2014-009597 A.

SUMMARY

In view of the above considerations, it is an object of the present disclosure to provide a fuel level sensor diagnosis device that may avoid, as much as possible, determining that a fuel level sensor is faulty as a result of a fuel tank being refueled with a small quantity of fuel causing a small amount of change in the fuel level sensor.

According to a first aspect of the present disclosure, there is provided a fuel level sensor diagnosis device for receiving a fuel level signal from a fuel level sensor that detects a remaining quantity of fuel in a fuel tank and for determining a failure in the fuel level sensor, including a fuel consumption integrator that integrates a fuel consumption amount signal representing a consumed amount of fuel of the fuel tank, a determination unit that determines a failure in the fuel level sensor when a total fuel consumption amount from the fuel consumption integrator exceeds a failure threshold value, an integrated value reset unit that resets the total fuel consumption amount when a change amount of the fuel level signal exceeds a predetermined reset threshold value, and a correction unit that, if the change amount of the fuel level signal does not exceed the reset threshold value when the fuel tank is supplied with fuel, determines a small quantity refueling and corrects the failure threshold value of the determination unit.

According to the above configuration, the fuel consumption integrator receives the fuel consumption amount signal representing a consumed amount of fuel of the fuel tank, and the determination unit determines a failure in the fuel level sensor when this total fuel consumption amount exceeds the failure threshold value. Further, the integrated value reset unit resets the total fuel consumption amount when the change amount of the fuel level signal exceeds the predetermined reset threshold value.

When the fuel level sensor is operating normally, the fuel level signal changes according to the fuel consumption amount. Accordingly, the change amount of the fuel level signal of the fuel level sensor exceeds the reset threshold before the fuel consumption amount reaches the failure threshold. As a result, the fuel consumption amount is cleared and the fuel consumption amount signal is integrated from the start again.

Further, when the fuel tank is supplied with fuel while nearly empty until nearly full, then again the change amount of the fuel level signal of the fuel level sensor exceeds the reset threshold, and once again the fuel consumption amount is cleared and the fuel consumption amount signal is integrated from the start.

When the fuel tank is supplied with a small quantity of fuel, there is a chance that the change amount of the fuel level signal of the fuel level sensor may not exceed the reset threshold. In this case, after determining a small quantity refueling, the correction unit corrects the failure threshold of the determination unit. Accordingly, even if the fuel consumption amount is not reset, it is delayed from reaching the failure threshold, and the chances of a misdiagnosis are reduced. Moreover, if small quantity refueling are repeated, this trend becomes significant, but since the correction unit corrects the failure threshold for each small quantity refueling, the accuracy of the diagnosis process may be ensured.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION (First Embodiment)

Hereinafter, a first embodiment of the present disclosure will be explained with reference to FIGS. 1 to 7.

Figure 1:
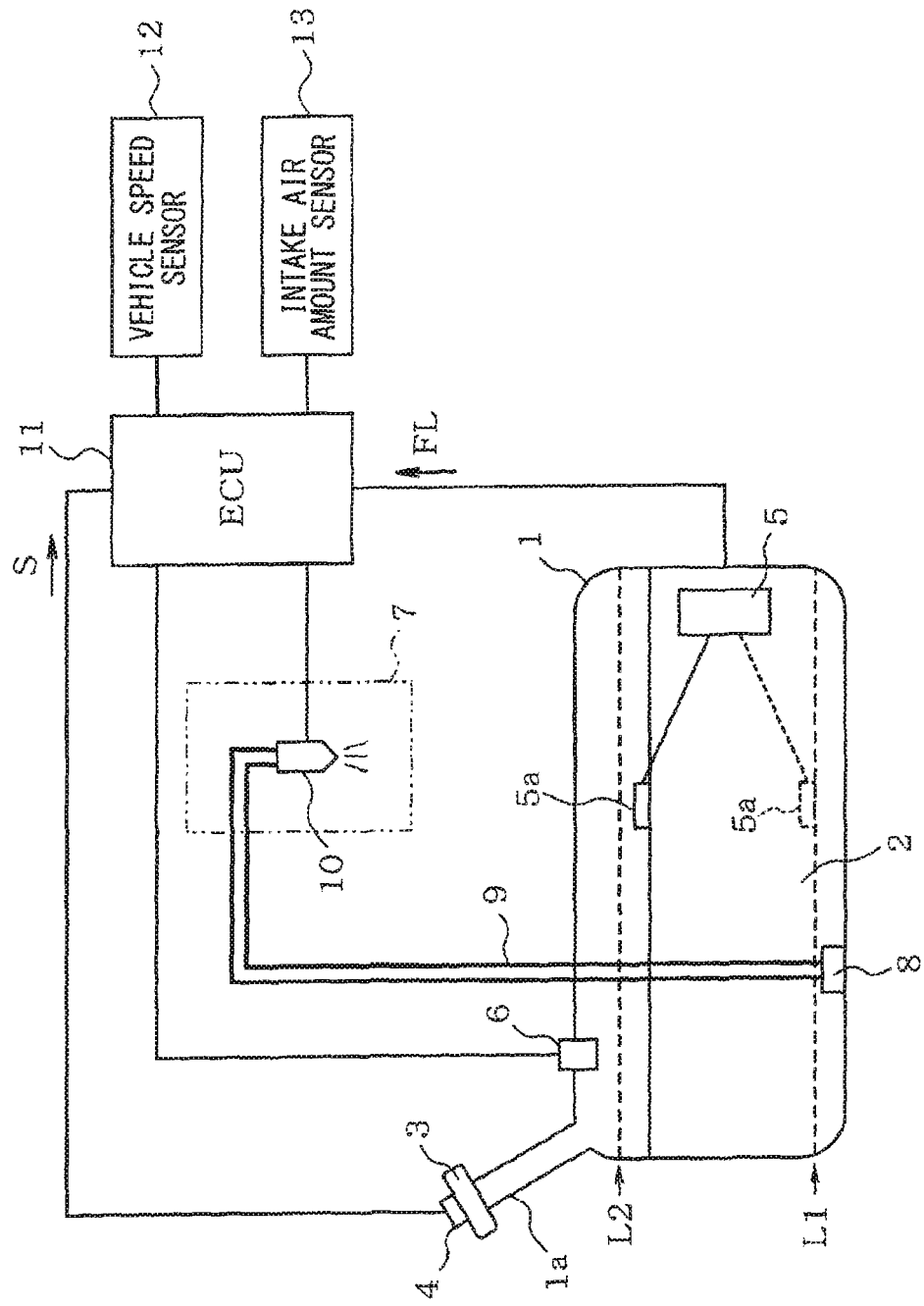
FIG. 1 is an outline view of the first embodiment.

FIG. 1 is a view showing the configuration of a system including a fuel level sensor diagnosis device. In FIG. 1, a fuel tank 1 is configured to store therein a predetermined amount of a fuel 2. In addition, the fuel tank 1 includes a fuel supply port 1a and a cap 3 configured to open and close. An opening and closing sensor 4 is disposed on the cap 3 to detect opening and closing of the cap 3. A fuel level sensor (or "FLS") 5 is disposed within the fuel tank 1 to detect the remaining amount of fuel 2 as a fuel level. The fuel level sensor 5 includes a float 5a that moves up and down according to the level (i.e., height) of the fuel 2 stored in the fuel tank 1. In addition, the fuel level sensor 5 outputs, as a fuel level signal, a level signal FL according to the level of the float 5a. The float 5a is configured to be movable within a range between a lowest position L1 and a highest position L2 in the fuel tank 1. The lowest level L1 corresponds to an empty state, while the highest position L2 corresponds to a full state.

It should be noted that the lowest position L1 is reached before the fuel 2 is actually "empty". Upon reaching the lowest position L1, the level signal FL is maintained at the lowest position L1 until the fuel 2 is "empty". As such, an empty dead zone (the maximum amount of fuel being $\Delta INJempty$) is defined as the region where the level signal FL is at the lowest position L1. Similarly, the highest position L2 is reached before the fuel 2 is actually "full". Upon reaching the highest level L2, the level signal FL is maintained at the highest level L2 until the fuel 2 is "full". As such, a full dead zone (the maximum amount of fuel being $\Delta INJfull$) is defined as the region where the level signal FL is at the highest position L2.

An internal pressure sensor 6 is disposed in the fuel tank 1. The internal pressure sensor 6 detects an internal pressure of the fuel tank 1 at a space not filled with the fuel 2. Further, a fuel pump 8 is disposed in the fuel tank 1. The fuel pump 8 pumps the fuel 2 toward an engine 7, and is connected to an injector 10 of the engine 7 through a fuel pipe 9. An electronic control unit (ECU) 11 controls the injector 10 to inject the fuel 2 into the engine 7.

The ECU 11 is connected to the fuel level sensor 5 and the opening and closing sensor 4 of the cap 3 as mentioned above. The level signal FL and a detection signal S that represents whether the cap 3 is open or closed are input to the ECU 11. Aside from these sensors, the ECU 11 is also connected to a vehicle speed sensor 12 that detects a traveling speed of the vehicle and an intake air amount sensor 13 that detects the amount of intake air toward the engine 7.

The ECU 11 functions as a diagnosis device for the fuel level sensor 5, and includes a microprocessor and a memory. A failure diagnosis program, which will be described later, is stored in the memory. When the level signal FL of the fuel level sensor 5 changes due to the fuel 2 in the fuel tank 1 being consumed or being replenished due to refueling, the ECU 11 diagnoses whether the fuel level sensor 5 is operating normally. In this regard, the ECU 11 includes the functions of each of a fuel consumption integrator, a determination unit, an integrated value reset unit, a correction unit, and the like, which are functional blocks that perform the processing steps of the failure diagnosis program.

Figure 2:
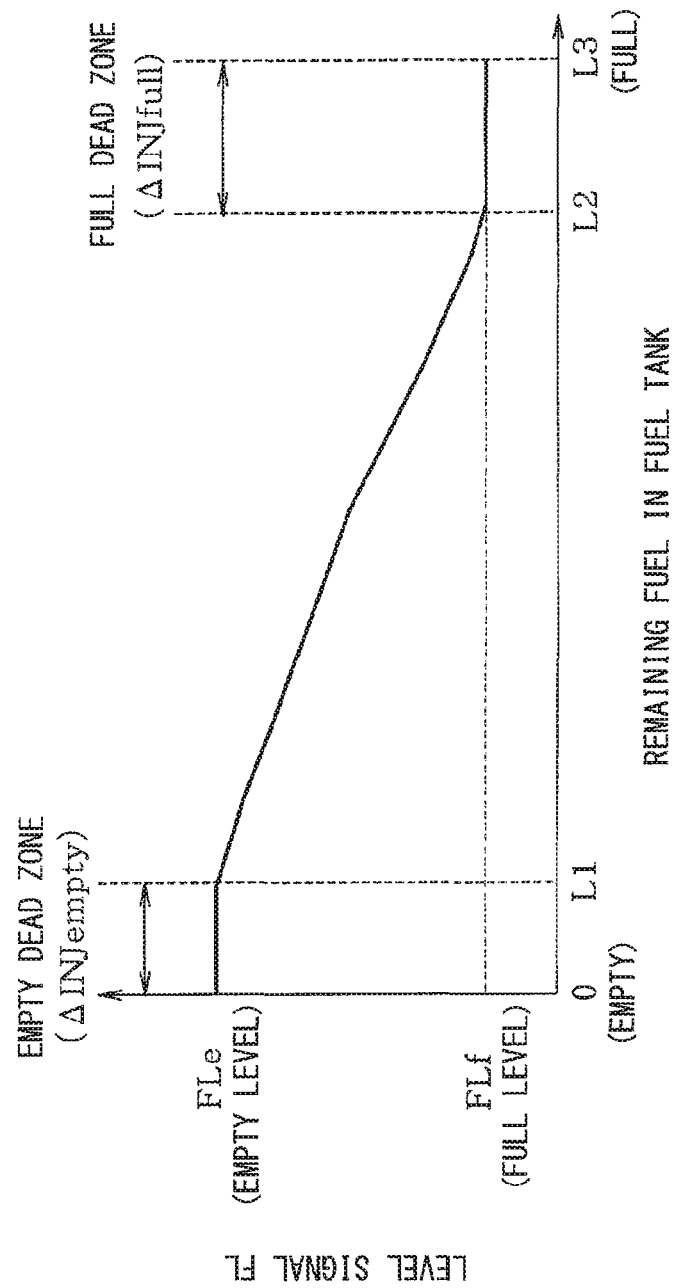
FIG. 2 shows a relationship between a level signal of a fuel level sensor and a remaining quantity of fuel in a fuel tank.

FIG. 2 shows a relationship between the level signal FL of the fuel level sensor 5 and the remaining amount of the fuel 2 in the fuel tank 1. As shown in FIG. 2, the level signal FL of the fuel level sensor 5 is output as a smaller value signal as the amount of the fuel 2 in the fuel tank 1 increases. Further, as explained above, the level signal FL of the fuel level sensor 5 is at a constant level FLe (empty level) during the empty dead zone, i.e., between the fuel 2 being "empty" and L1. Next, the as the remaining amount of the fuel 2 increases, the level signal FL decreases in a substantially proportional manner. Then, the level signal FL reaches a constant level FLf (full level) upon reaching the full dead zone, i.e., from L2 to the fuel 2 being "full".

It should be noted that depending on the shape of the fuel tank 1 or devices positioned within the fuel tank 1, the relationship between the level signal FL and the remaining amount of the fuel 2 may not maintain a constant proportional relationship. In other words, for the fuel tank 1 shown in FIG. 1, the line representing a relationship between the remaining amount of the fuel 2 and the level signal FL may be bent such that its slope changes in an intermediate region, as shown in FIG. 2.

Further, as explained above, a region where the level signal FL of the fuel level sensor 5 follows the remaining amount of the fuel 2 (from L1 to L2), as well as dead zone regions where the level signal FL of the fuel level sensor 5 does not follow the remaining amount of the fuel 2 (from 0 to L1, and from L2 to L3), exist. For this reason, near the full area where the remaining amount of the fuel 2 in the fuel tank 1 is "full" and near the empty area where the remaining amount of the fuel 2 in the fuel tank 1 is "empty", the level signal FL of the fuel level sensor 5 remains at FLf or FLe without changing when compared to the actual consumption amount of the fuel 2.

In addition, for the following explanation, the maximum amount of fuel stored in the empty dead zone is denoted as $\Delta INJempty$, and the maximum amount of fuel stored in the full dead zone is denoted as $\Delta INJfull$. Further, after the fuel tank 1 is fully refueled with the fuel 2, the remaining amount of the fuel 2 in the tank 1 changes from L3 to L2 to L1 to 0 as the fuel 2 is consumed. If the fuel tank 1 is fully refueled with the fuel 2 again, then the remaining amount recovers from 0 to L3.

Figure 3:
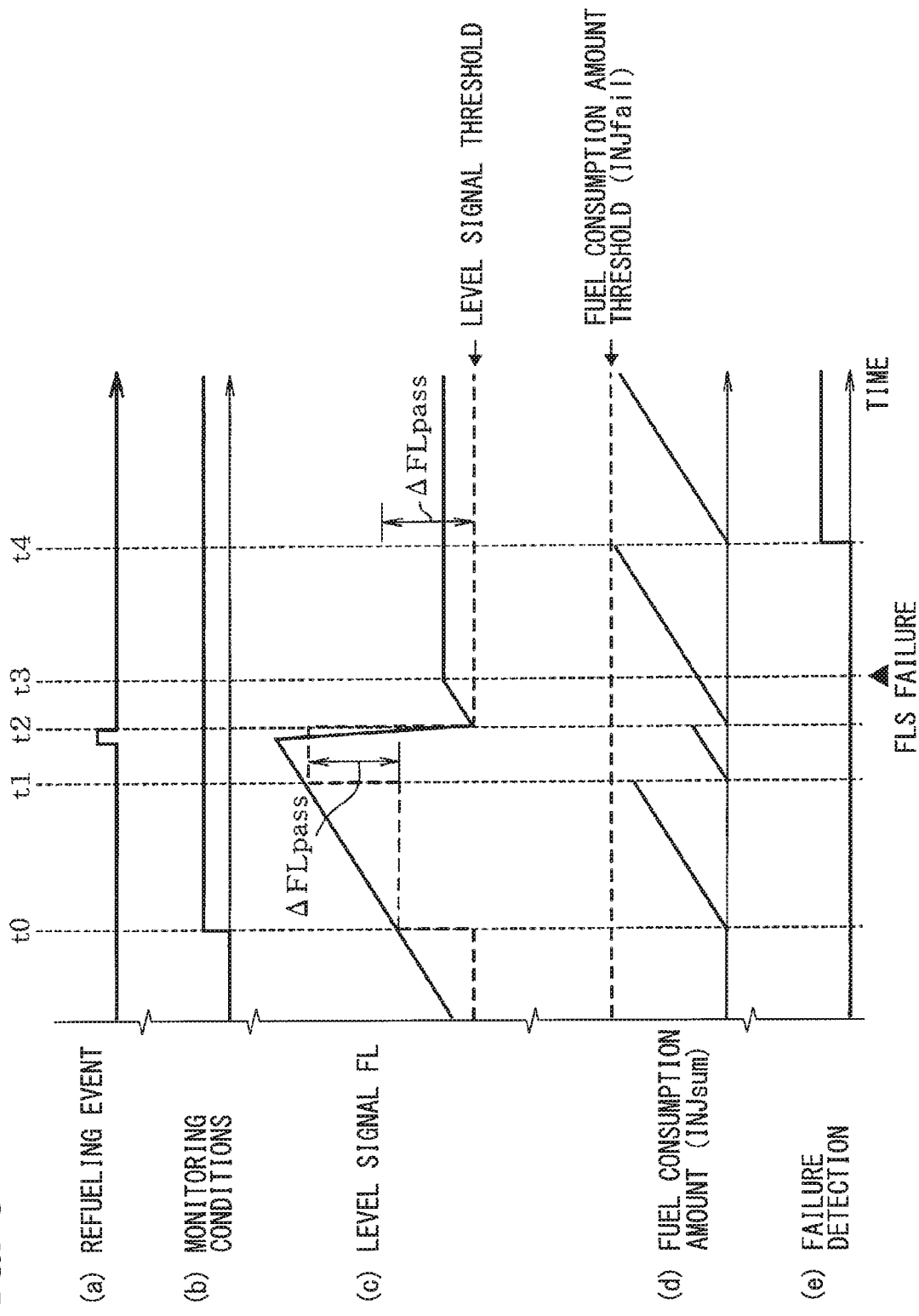
FIG. 3 is a time chart showing transitions of a fuel consumption amount, a level signal, and the like of a fuel level sensor.

FIG. 3 is a time chart showing a failure diagnosis flow for the fuel level sensor 5. According to this diagnosis operation, the ECU 11 is performing a diagnosis operation, and when the remaining amount in the fuel tank 1 decreases due to fuel consumption, the fuel tank 1 is refueled with the fuel 2 to full or to nearly full. Then, the ECU 11 is shown to change from determining that the fuel level sensor 5 is operating normally to determining that the fuel level sensor 5 is operating abnormally.

The ECU 11 reads and executes the failure diagnosis program from the memory to performing diagnosis on the fuel level sensor 5. At time t0, the ECU 11 establishes monitoring conditions for the operation of the fuel level sensor 5. Then, the ECU 11 continuously sums up (i.e., integrates) the amount of the fuel 2 consumed due to injection by the injector 10 as a fuel consumption amount INJsum.

When the fuel level sensor 5 is operating normally, the level signal FL changes (specifically, increases) as the fuel 2 is consumed. Then, at time t1, the change amount ΔFL of the level signal FL of the fuel level sensor 5 exceeds a predetermined value ΔFLpass (i.e., ΔFL>ΔFLpass). Here, the predetermined value ΔFLpass is a reset threshold for the level signal. As a result, the ECU 11 determines that the fuel level sensor 5 has not failed. After making this determination, the ECU 11 resets (i.e., clears) the total fuel consumption amount INJsum (which is being summed up over time), and then continues the diagnosis.

Next, since the remaining amount of the fuel 2 in the fuel tank 1 is low, a refueling event is performed. Such an event may be, for example, a user supplying (refueling) the fuel 2. Accordingly, the level signal FL of the fuel level sensor 5 changes. At this time, due to the detection signal S from the opening and closing sensor 4, the ECU 11 is able to recognize that the cap 3 of the fuel tank 1 is "open", and that the changes in the level signal FL represent an increase in the fuel 2. Next, at time t2, due to the detection signal S from the opening and closing sensor 4, the ECU 11 recognizes that the cap 3 of the fuel tank 1 is "closed", i.e., that the refueling process is complete. At this time, since the change amount ΔFL of the level signal FL of the fuel level sensor 5 exceeds the predetermined value ΔFLpass (i.e., ΔFL>ΔFLpass), the ECU 11 resets the fuel consumption amount INJsum again.

Next, an exemplary situation where the fuel level sensor 5 has failed will be explained. For example, at t3, the fuel level sensor 5 fails. Thereafter, even if the float 5a experiences an upward or downward displacement, the level signal FL remains constant and does not change. Meanwhile, the ECU 11 continues to integrate the fuel consumption amount INJsum as fuel is consumed. Then at t4, when the fuel consumption amount INJsum exceeds a fuel consumption amount threshold INJfail, the change amount ΔFL of the level signal FL at this point in time has not exceeded the predetermined value ΔFLpass. As a result, the ECU 11 determines that the fuel level sensor 5 has failed.

The ECU 11 performs a failure diagnosis on the fuel level sensor 5 in the above manner. However, it should be noted that when the fuel 2 is supplied, there is a chance that even if the fuel level sensor 5 is operating normally, the change amount ΔFL of the level signal FL might not exceed the predetermined value ΔFLpass. This kind of refueling event happens when the fuel tank 1 is refueled with a small quantity of the fuel 2. In this case, by following the above described failure diagnosis process, there is a concern that the fuel consumption amount INJsum may not be reset, thereby causing a misdiagnosis. Accordingly to the present embodiment, such a misdiagnosis of the fuel level sensor 5 is avoided even in this situation.

Figure 4:
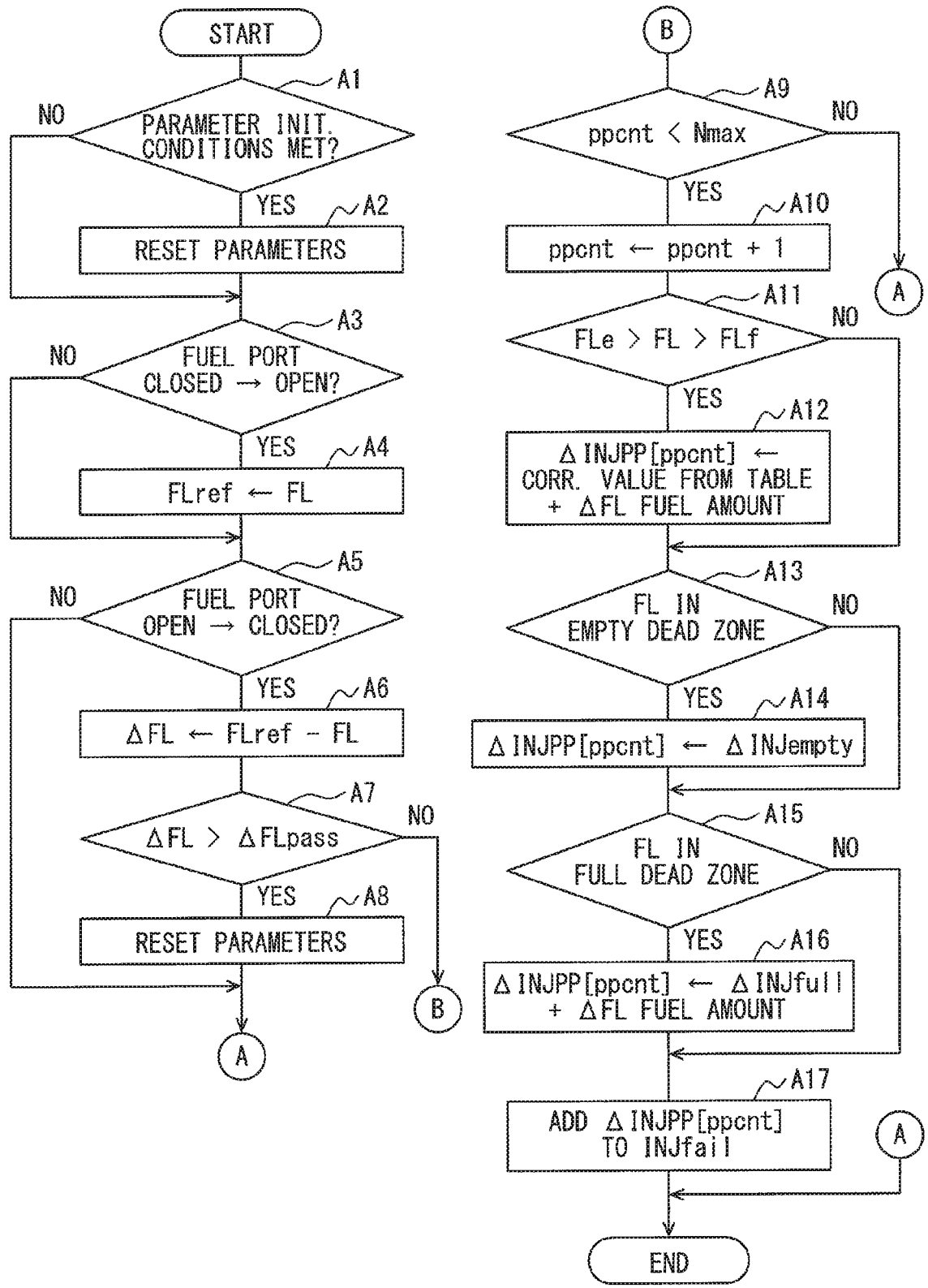
FIG. 4 is a flow chart of a failure diagnosis program for a fuel level sensor.

FIG. 4 is a flowchart of a failure diagnosis program performed by the ECU 11 corresponding to when a small quantity refueling is performed as described above. The ECU 11 repeatedly performs this failure diagnosis program at appropriate timings. Accordingly, even if a small quantity of the fuel 2 is refueled as described above, misdiagnosis of the fuel level sensor 5 may be avoided.

In FIG. 4, first the ECU 11 performs a parameter initialization condition check, as a pre-preparation process for failure diagnosis (A1). At this parameter initialization condition check, when any of a "battery reset event", "normal determination event", and "failure determination event" condition is satisfied ("YES" at A1), the ECU 11 then resets a variety of correction parameters (A2). Here, the "battery reset event" is an event of detecting that a new battery is connected due to the battery being exchanged or the like. Further, "normal determination event" and "failure determination event" are events of detecting that the fuel level sensor 5 is operating normally or has failed, respectively. In addition, the various correction parameters cleared at step A2 include a consecutive correction count ppcnt, a fuel consumption amount correction amount ΔINJPP[k] (k ranging from 1 to ppcnt), a mid-correction fuel consumption amount ΔINJSUMPP[k] (k ranging from 1 to ppcnt), a mid-correction flag (which is reset to "OFF"), and the like.

After determining "NO" at A1 or after performing A2, the ECU 11 determines whether a refueling event has started, i.e., whether the cap 3 of the fuel tank 1 has transitioned from "closed" to "open", based on the detection signal S of the opening and closing sensor 4 (A3). If the detection signal S of the opening and closing sensor 4 indicates a transition from "closed" to "open", the ECU 11 records the level signal FL of the fuel level sensor 5 at the start time of the refueling event as FLref (A4).

After determining "NO" at A3 or after performing A4, the ECU 11 determines whether the fuel supply port has closed and the refueling event has finished, i.e., whether the cap 3 of the fuel tank 1 transitioned from "open" to "closed" or not, based on the detection signal S of the opening and closing sensor 4 (A5). If the detection signal S of the opening and closing sensor 4 indicates a transition from "open" to "closed", the ECU 11 determines that the refueling event has finished. Then at step A6, the ECU 11 calculates a change amount ΔFL as a difference between the level signal FL of the fuel level sensor 5 at the end time of the refueling event and the FLref value of the start time of the refueling event recorded at step A4. In other words, ΔFL is calculated as a change amount ΔFL of the level signal FL of the fuel level sensor 5 when the fuel tank 1 is refueled.

Next, the ECU 11 determines whether the change amount ΔFL calculated at step A6 exceeds a predetermined value ΔFLpass (i.e., ΔFL>ΔFLpass) (A7). In the case of "YES" at step A7, the refueling amount of the fuel 2 is above a predetermined threshold, and the ECU 11 resets the fuel consumption amount INJsum as well as the other correction parameters (A8). After performing step A8, the ECU 11 terminates the program. Further, if the ECU 11 determines "NO" at step A5, the ECU 11 repeats the program and waits until the cap 3 of the fuel tank 1 is detected as being closed.

In addition, if "NO" is determined at step A7, this means the fuel 2 is supplied, but the change amount ΔFL of the level signal FL of the fuel level sensor 5 is a sufficiently small amount so as to not exceed the predetermined value ΔFLpass. In this case, the ECU 11 continues the diagnosis operation without resetting the various correction parameters. For this reason, the fuel consumption amount INJsum value is not reset, and continues to increase as fuel is consumed.

Next, to avoid a misdiagnosis caused by continuing the diagnosis operation without resetting the fuel consumption amount INJsum, the ECU 11 performs an operation to correct the fuel consumption amount threshold INJfail. At this time, a maximum consecutive correction count Nmax is set to limit the number of times a correction may be performed consecutively, in order to sufficiently ensure that failure is detected. For example, the maximum consecutive correction count Nmax may be set to 3 times. Further, the maximum consecutive correction count Nmax may be set to any appropriate number of times.

At step A9, the ECU 11 checks whether the consecutive correction count ppcnt value has reached the maximum consecutive correction count Nmax. If the consecutive correction count ppcnt value has not reached the maximum consecutive correction count Nmax, the ECU 11 increases the consecutive correction count ppcnt value by "1" (A10). Next, the ECU 11 determines if the current level signal FL of the fuel level sensor 5 is between the level FLe indicating an empty level and the level FLf indicating a full level (A11). The maximum consecutive correction count Nmax value prevents correction values, which will be discussed later, from increasing too much due to repeated corrections. Further, when the ECU 11 determines "NO" at step A9, the program terminates.

If the level signal FL is in an intermediate region, i.e., between the level FLe and the level FLf ("YES" at A11), then the ECU 11 sets the fuel consumption amount correction amount $\Delta$INJPP[current correction count (ppcnt)] in the following manner. The fuel consumption amount correction amount $\Delta$INJPP[ppcnt] is for correcting the fuel consumption amount threshold INJfail which determines the failure determination timing for the fuel level sensor 5. Here, the small supplied amount of the fuel 2 is estimated from the change amount $\Delta$FL of the level signal FL, and when injected, this increased fuel 2 is added to the fuel consumption amount.

An output characteristics table of the level signal FL of the fuel level sensor 5 is stored in the memory of the ECU 11. At step A12, the ECU 11 refers to data in the output characteristics table, then adds a corresponding fuel amount to the change amount $\Delta$FL (=FLref−level signal FL) of the level signal FL before and after supplying the fuel 2. The ECU 11 stores this result as $\Delta$INJPP[ppcnt]. Here, the ppcnt in $\Delta$INJPP[ppcnt] represents the current correction count, which may be "1" for the first time for example.

In addition, even when the ECU 11 determines "YES" at step A11, if the level signal FL was in the empty dead zone prior to refueling, then the amount of fuel supplied within the empty dead zone may be considered. In this case, the output characteristics table is designed to add a data value corresponding to the maximum stored amount $\Delta$INJempty of the empty dead zone to the change amount $\Delta$FL of the level signal FL.

After determining "NO" at step A11 or after performing step A12, the ECU 11 continues to step A13. Here, in the case of "NO" at step A11, the ECU 11 determines whether the current level signal FL of the fuel level sensor 5 is in the empty dead zone, i.e., does not change according to the remaining amount of the fuel 2. If the level signal FL is in the empty dead zone ("YES" at A13), the ECU 11 sets the $\Delta$INJPP[ppcnt] value at step A14 in the following manner. Specifically, the ECU 11 stores the maximum stored amount $\Delta$INJempty in the empty dead zone as $\Delta$INJPP[ppcnt]. Here, the maximum stored amount $\Delta$INJempty is a value corresponding to a usable amount of the fuel 2 upon entering the empty dead zone.

Further, after determining "NO" at step A13 or after performing step A14, the ECU 11 continues to step A15. Here, in the case of "NO" at step A11 and step A13, the ECU 11 determines whether the current level signal FL of the fuel level sensor 5 is in the full dead zone, i.e., does not change according to the remaining amount of the fuel 2. In the case of "YES", the ECU 11 sets the $\Delta$INJPP[ppcnt] value at step A16 in the following manner. Specifically, the ECU 11 adds the maximum stored amount $\Delta$INJfull in the full dead zone with a fuel amount corresponding to the change amount $\Delta$FL (=FLref−level signal FL) of the level signal FL before and after refueling. The ECU 11 stores this result as $\Delta$INJPP [ppcnt]. Here, the maximum stored amount $\Delta$INJfull is a value corresponding to a usable amount of the fuel 2 upon entering the full dead zone.

Accordingly, the ECU 11 is able to set the fuel consumption amount correction amount $\Delta$INJPP[ppcnt] according to whether the current level signal FL of the fuel level sensor 5 is in an intermediate region, the empty dead zone, or the full dead zone. Next, the ECU 11 adds the stored correction amount $\Delta$INJPP[ppcnt] for the small quantity refueling calculated above to the fuel consumption amount threshold INJfail value, and terminates the program.

Thereafter, when performing a failure diagnosis on the fuel level sensor 5, the ECU 11 performs the failure diagnosis process using the new fuel consumption amount threshold INJfail value, which is increased by a correction value calculated as the correction value $\Delta$INJPP[ppcnt] from the above described process.

Figure 5:
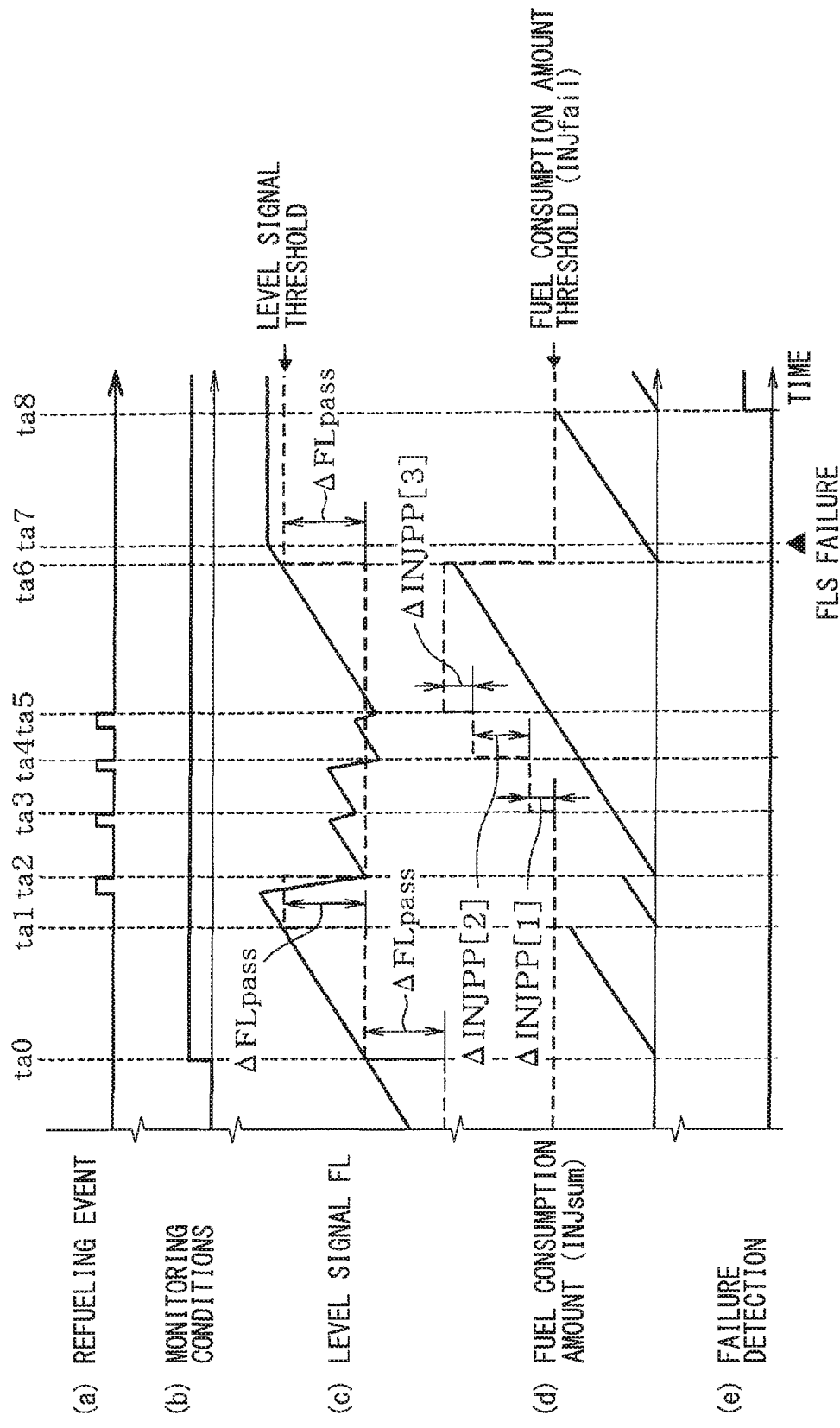
FIG. 5 is a time chart showing transitions of a fuel consumption amount, a level signal, and the like of a fuel level sensor for a small quantity refueling.
Figure 6:
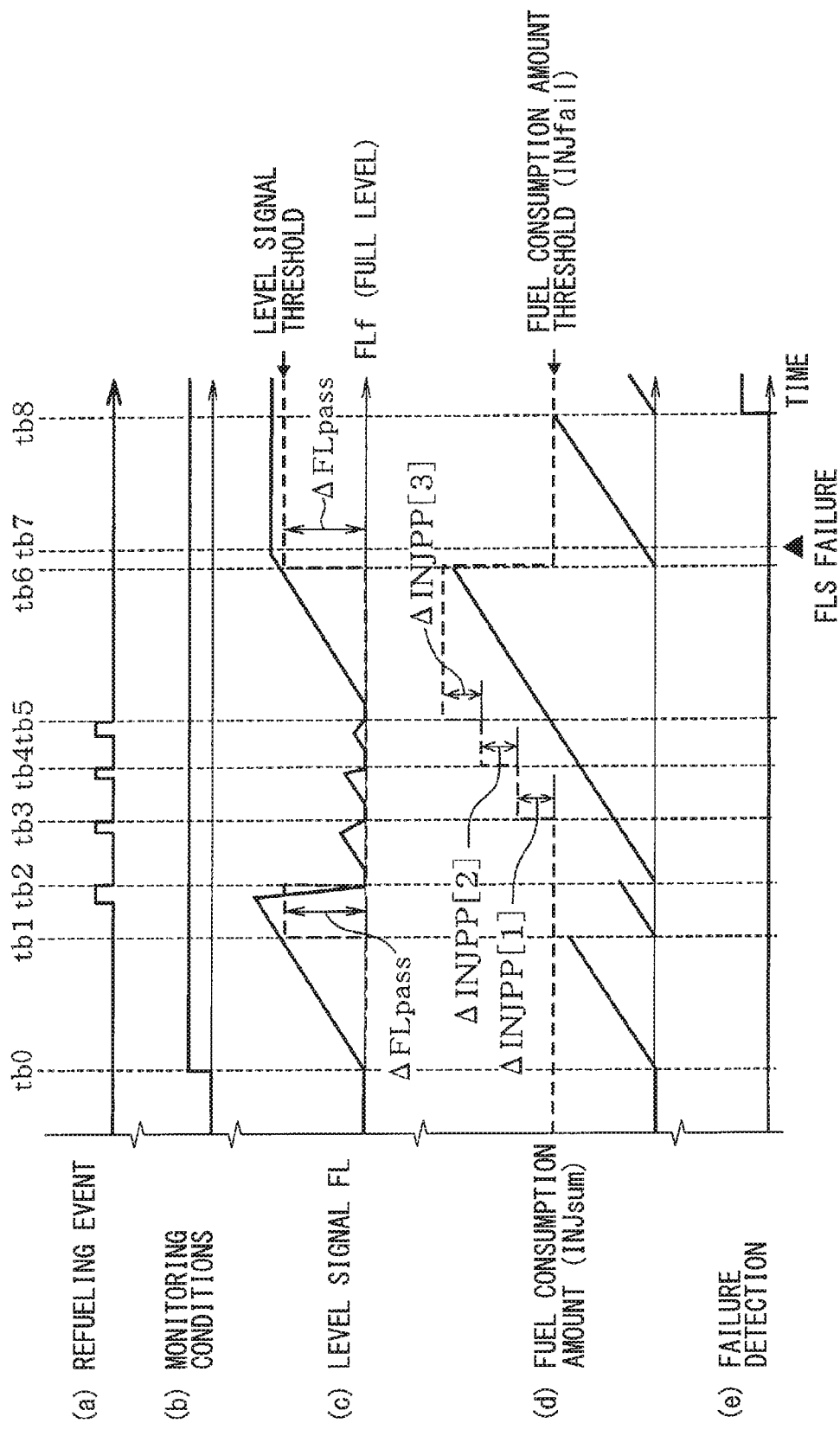
FIG. 6 is a time chart showing transitions of a fuel consumption amount, a level signal, and the like of a fuel level sensor for a small quantity refueling.
Figure 7:
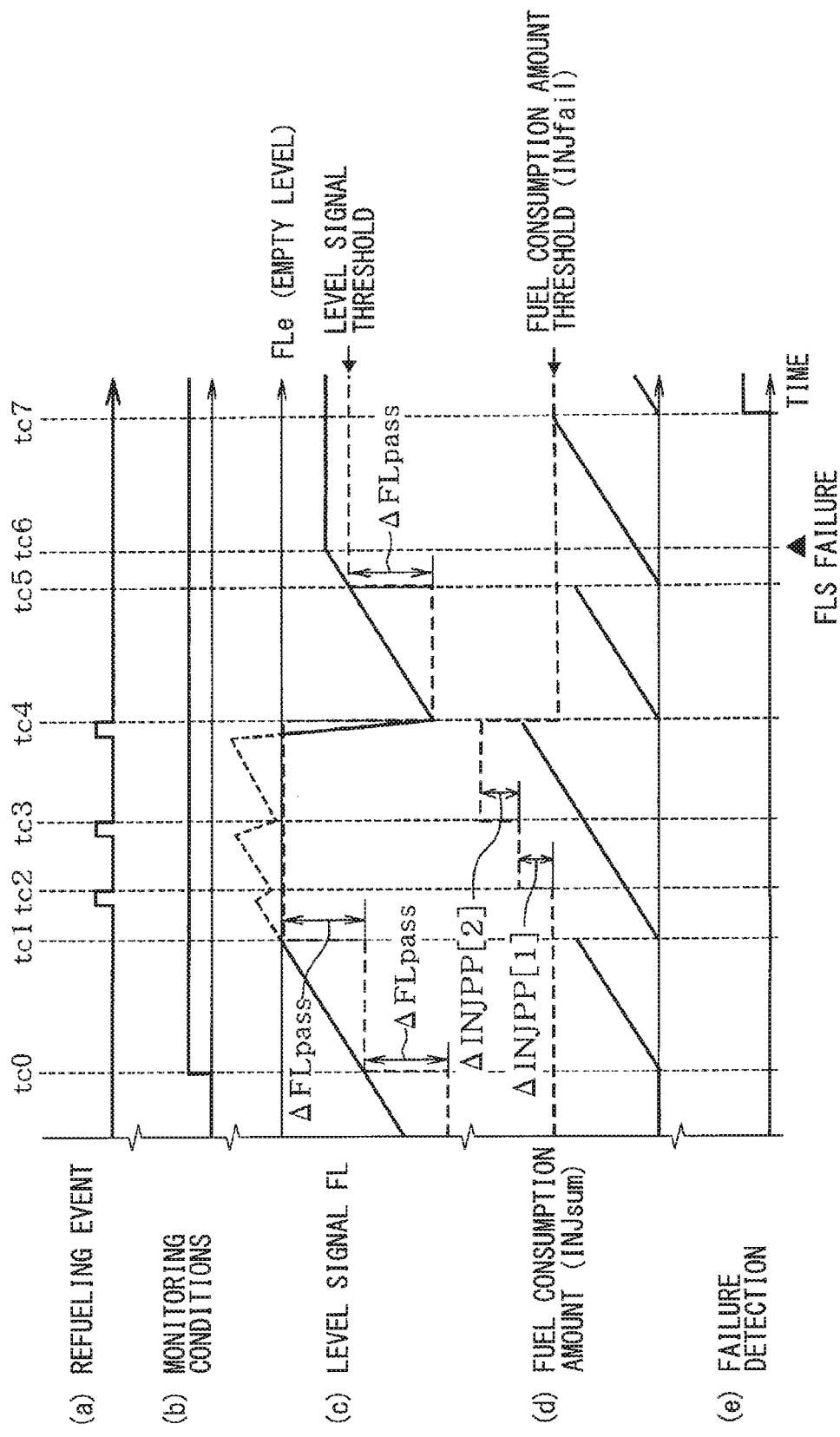
FIG. 7 is a time chart showing transitions of a fuel consumption amount, a level signal, and the like of a fuel level sensor for a small quantity refueling.

Next, for performing the process of correcting the fuel consumption amount threshold INJfail as described above, three specific situations will be explained with reference to FIGS. 5 to 7. FIG. 5 shows a specific example of when the level signal FL of the fuel level sensor 5 is a value in the intermediate region during refueling ("YES" at A11). Further, FIG. 6 is a specific example of when the level signal FL is a value in the empty dead zone ("YES" at A13), and FIG. 7 is a specific example of when the level signal FL is a value in the full dead zone ("YES" at A15).

First, the specific example of FIG. 5 will be explained. In this case, for example, the monitoring conditions are satisfied at time ta0, and the ECU 11 begins the failure diagnosis program for the fuel level sensor 5. As mentioned above, the ECU 11 performs steps A1 and A2 of the program shown in FIG. 4, and then continuously sums up the consumed quantity of the fuel 2 due to injection by the injector 10 as the fuel consumption quantity INJsum.

While the fuel level sensor 5 is operating normally, the level signal FL changes in accordance with consumption of the fuel 2. Then, at time ta1, the change amount $\Delta$FL of the level signal FL of the fuel level sensor 5 exceeds the predetermined value $\Delta$FLpass (i.e., $\Delta$FL>$\Delta$FLpass). As a result, the ECU 11 determines that the fuel level sensor 5 has not failed. After making this determination, the ECU 11 resets the total fuel consumption amount INJsum, and then continues the diagnosis.

Next, since the remaining amount of the fuel 2 in the fuel tank 1 is low, a refueling event is performed, such as a user supplying (refueling) the fuel 2. Accordingly, the level signal FL of the fuel level sensor 5 changes. By performing steps A3 to A5, the ECU 11 recognizes that the fuel 2 is supplied to the fuel tank 1, and at time ta2 determines that a refueling event has been performed. At this time, the change amount $\Delta$FL of the level signal FL of the fuel level sensor 5 exceeds the predetermined value $\Delta$FLpass (i.e., $\Delta$FL>$\Delta$FLpass), and as a result the ECU 11 resets the fuel consumption amount INJsum (by performing steps A6 to A8).

Next, an explanation will be provided for a situation in which a small quantity of fuel is supplied to the fuel tank 1 even though the fuel 2 in the fuel tank 1 has not reduced to the empty level. As the fuel 2 in the fuel tank 1 is consumed, the level signal FL changes to show that fuel is decreasing.

Then, when the fuel tank 1 is refueled with a small quantity of the fuel 2, the ECU 11 determines, for example at time ta3, that a refueling event has occurred ("YES" at A5). At this time, the change amount ΔFL of the level signal FL has not exceeded the predetermined value ΔFLpass, thus the ECU 11 determines that a small quantity refueling event has occurred ("NO" at A7).

As a result, the ECU 11 continues the diagnosis without resetting the total fuel consumption amount INJsum. However, the ECU 11 also estimates the supplied amount of the fuel 2 and corrects the fuel consumption amount threshold INJfail for determining failures. In other words, the ECU 11 determines that the level signal FL of the fuel level sensor 5 is in the intermediate region ("YES" at A11), and sets the ΔINJPP[ppcnt] value (A12).

At this time, the output characteristics table of the level signal FL sets correction values in cases such as when, as shown in FIG. 2, the output characteristic of the level signal is bent due to the shape of the fuel tank 1. Accordingly, the ECU 11 calculates ΔINJPP[ppcnt] by adding this correction value to the amount of the fuel 2 corresponding to the change amount ΔFL of the level signal FL before and after refueling (A12). This is the first correction value, thus resulting in ΔINJPP[1]. The ECU 11 then adds the value of ΔINJPP[1] to the fuel consumption amount threshold INJfail (A17). As a result, the amount of time required for the fuel consumption amount INJsum value to reach the fuel consumption amount threshold INJfail is extended.

Next, when the fuel tank 2 is repeatedly supplied with a small quantity of the fuel 2 in a similar manner as above, the ECU 11 in response obtains ΔINJPP[2] at time ta4 and ΔINJPP[3] at ta5 as correction values, while continuing to increase the fuel consumption amount INJsum value. After the refueling event at time ta5, the change amount ΔFL of the level signal FL reaches the predetermined value ΔFLpass at, for example, time ta6. At this time, the fuel consumption amount INJsum has not reached the fuel consumption amount threshold INJfail. As a result, the ECU 11 determines that the fuel level sensor 5 is operating normally. Then, the ECU 11 clears the total fuel consumption amount INJsum, and continues the failure diagnosis. In addition, since the ECU 11 has determined that the fuel level sensor 5 is operating normally, the next time that the failure diagnosis program is executed, one of the parameter initialization conditions is met ("YES" at A1). As a result, the fuel consumption amount threshold INJfail will be reset to the uncorrected value (A2).

In addition, if the fuel tank 1 is supplied with a small quantity of fuel as described above when the fuel 2 is at a level within the empty dead zone, the level of the fuel 2 may exceed the empty dead zone after refueling is complete. In this case, the value of ΔINJPP[ppcnt] is set in the same manner at step A12. However, the value of the output characteristics table is set in the following manner. Specifically, if the refueling event starts when the level signal FL is in the empty dead zone, then a different data value is used. This different data value is set as a value obtained by adding the maximum stored amount ΔINJempty (representing the amount of fuel supplied during the empty dead zone until reaching the empty level) to the change amount ΔFL of the level signal FL in the interim region. Accordingly, even if the fuel tank 1 is not completely empty when refueled, the maximum stored amount ΔINJempty is still added. In other words, the correction is performed by assuming that the fuel tank 1 was empty.

Further, a situation where the fuel level sensor 5 has failed will be explained. For example, at time ta7, a failure occurs in the fuel level sensor 5, and thereafter the level signal FL remains at a constant level. Meanwhile, the ECU 11 continues to add to the fuel consumption amount INJsum in accordance with consumption of fuel. Then at ta8, when the fuel consumption amount INJsum exceeds the fuel consumption amount threshold INJfail, the change amount ΔFL of the level signal FL at this point in time has not exceeded the predetermined value ΔFLpass. As a result, the ECU 11 determines that the fuel level sensor 5 has failed.

According to the above, when a small quantity of the fuel 2 is supplied, by correcting the fuel consumption amount threshold INJfail by a margin corresponding to the supplied amount, an appropriate determination timing may be set. As a result, misdiagnoses may be avoided, and a more accurate diagnosis operation may be performed.

Next, an explanation will be provided for a situation in which the level signal FL is a value in the full dead zone, as shown in FIG. 6. Similar to before, the monitoring conditions are satisfied at time tb0, and the ECU 11 begins the failure diagnosis program for the fuel level sensor 5. In this case, the level signal FL of the fuel level sensor 5 at the starting time point is the value FLf, indicating the full level. The ECU 11 performs steps A1 and A2 of the program shown in FIG. 4, and then continuously sums up the consumed quantity of the fuel 2 due to injection by the injector 10 as the fuel consumption amount INJsum.

While the fuel level sensor 5 is operating normally, for example at time tb1, the change amount ΔFL of the level signal FL of the fuel level sensor 5 exceeds the predetermined value ΔFLpass (i.e., ΔFL>ΔFLpass). As a result, the ECU 11 determines that the fuel level sensor 5 has not failed. After making this determination, the ECU 11 resets the total fuel consumption amount INJsum, and then continues the failure diagnosis process.

Next, since the fuel 2 is consumed, the fuel 2 is supplied (refueled) by a user, and the level signal FL of the fuel level sensor 5 changes. Here, by performing steps A3 to A5, the ECU 11 recognizes that the fuel 2 is supplied to the fuel tank 1, and at time tb2 determines that a refueling event has been performed. At this time, the change amount ΔFL of the level signal FL of the fuel level sensor 5 exceeds the predetermined value ΔFLpass (i.e., ΔFL>ΔFLpass), and as a result the ECU 11 resets the fuel consumption amount INJsum (by performing steps A6 to A8).

Further, in this case, the level signal FL of the fuel level sensor 5 enters the full dead zone and thus stops at the full level. However, the fuel tank 1 is actually further refueled until completely full. From this state, if the fuel 2 is consumed, then the level signal FL of the fuel level sensor 5 will remain stopped at the full level for a period of time. Then, after transitioning from the full dead zone to the intermediate region, the level signal FL will begin to change again.

Next, an explanation will be given for a situation in which the fuel tank 1 is refueled with a small quantity of fuel while the fuel 2 in the fuel tank 1 is near the full level. When the fuel tank 1 is refueled with a small quantity of the fuel 2, the ECU 11 determines, for example at time tb3, that a refueling event has occurred ("YES" at A5). At this time, the change amount ΔFL of the level signal FL has not exceeded the predetermined value ΔFLpass. Accordingly, the ECU 11 determines that the refueling event was for a small quantity of fuel. ("NO" at A7).

As a result, the ECU 11 continues the failure diagnosis process without resetting the total fuel consumption amount INJsum. However, the ECU 11 also estimates the supplied amount of the fuel 2 and corrects the fuel consumption amount threshold INJfail for determining failures. In other words, the ECU 11 determines that the level signal FL of the fuel level sensor 5 is in the full dead zone ("YES" at A15), and sets the ΔINJPP[ppcnt] value (A16).

Specifically, due to supplying the fuel tank 1 with a small quantity of the fuel 2 at time tb3, the level signal FL is a value in the full dead zone. In this case, the ECU 11 adds the maximum stored amount ΔINJfull with the change amount ΔFL of the level signal FL as the level signal FL moves from the intermediate region to the full dead zone. The ECU 11 then sets this sum as ΔINJPP[1]. The value of ΔINJfull is a correction value determined in advance, representing the maximum stored amount of fuel in the full dead zone. In other words, even if the fuel tank 1 is not actually refueled until completely full, this maximum stored amount is still added to the correction amount, thus assuming that the fuel tank 1 is full.

Accordingly, ΔINJPP[1] is the first correction value. The ECU 11 then adds the value of ΔINJPP[1] to the fuel consumption amount threshold INJfail (A17). As a result, the amount of time required for the fuel consumption amount INJsum value to reach the fuel consumption amount threshold INJfail is extended.

Next, when the fuel tank 2 is repeatedly supplied with a small quantity of the fuel 2 in a similar manner as above, the ECU 11 in response obtains ΔINJPP[2] at time tb4 and ΔINJPP[3] at tb5 as correction values, while continuing to increase the fuel consumption amount INJsum value. After the refueling event at time tb5, the change amount ΔFL of the level signal FL reaches the predetermined value ΔFLpass at, for example, time tb6. At this time, the fuel consumption amount INJsum has not reached the fuel consumption amount threshold INJfail. As a result, the ECU 11 determines that the fuel level sensor 5 is operating normally. Then, the ECU 11 clears the total fuel consumption amount INJsum, and continues the failure diagnosis.

In addition, since the ECU 11 has determined that the fuel level sensor 5 is operating normally, the next time that the diagnosis program is executed, one of the parameter initialization conditions is met ("YES" at A1). As a result, the fuel consumption amount threshold INJfail will be reset to the uncorrected value (A2).

Further, in the case the fuel level sensor 5 fails, a failure state will be detected at tb8 in the same manner as explained above with respect to FIG. 5. According to the above, when a small quantity of the fuel 2 is supplied while the fuel tank 1 is at or near full, by correcting the fuel consumption amount threshold INJfail by a margin corresponding to the supplied amount, misdiagnoses may be avoided. As a result, an even more accurate diagnosis operation may be performed.

Next, an explanation will be provided for a situation in which the level signal FL is a value in the empty dead zone, as shown in FIG. 7. Similar to before, the monitoring conditions are satisfied at time tc0, and the ECU 11 begins the failure diagnosis program for the fuel level sensor 5. In this case, the level signal FL of the fuel level sensor 5 at the starting time point indicates an intermediate level. The ECU 11 performs steps A1 and A2 of the program shown in FIG. 4, and then continuously sums up the consumed quantity of the fuel 2 due to injection by the injector 10 as the fuel consumption quantity INJsum.

While the fuel level sensor 5 is operating normally, for example at time tc1, the change amount ΔFL of the level signal FL of the fuel level sensor 5 exceeds the predetermined value ΔFLpass (i.e., ΔFL>ΔFLpass). As a result, the ECU 11 determines that the fuel level sensor 5 is operating normally. After making this determination, the ECU 11 resets the total fuel consumption amount INJsum, and then continues the failure diagnosis process.

Next, as the fuel 2 is consumed, the level signal FL enters the empty dead zone and remains at the empty level (FLe). Thereafter, the fuel 2 is supplied (refueled) by a user prior to tc2. In this case, the fuel tank 1 is refueled with a sufficiently small quantity of the fuel 2 such that the level signal FL remains in the empty dead zone, and thus remains at the FLe level. It should be noted that in FIG. 7, the actual level of fuel in the fuel tank 1 is shown by the dotted line in the empty dead zone, while the level signal FL from the fuel level sensor 5 remains at the FLe level. Meanwhile, by performing steps A3 to A5, the ECU 11 recognizes that the fuel 2 is supplied to the fuel tank 1, and at time tc2 determines that a refueling event has been performed ("YES" at A5). At this time, the change amount ΔFL of the level signal FL of the fuel level sensor 5 has not exceeded the predetermined value ΔFLpass. As a result the ECU 11 determines that the refueling event was for a small quantity of fuel ("NO" at A7), and the ECU 11 does not reset the fuel consumption amount INJsum.

As explained previously, even if the level signal FL of the fuel level sensor 5 is in the empty dead zone, there may be a small amount of fuel remaining in the fuel tank 1, such that the fuel tank 1 is not "empty". From this state, if the fuel 2 is supplied, then the level signal FL of the fuel level sensor 5 will remain stopped at the empty level for a period of time. If the supplied quantity of fuel is sufficiently small (e.g., in the refueling event of tc2 described above), then the level signal FL remains at the empty level throughout the refueling event.

Next, since the ECU 11 determines that a small quantity refueling event has occurred at tc2, the ECU 11 corrects the fuel consumption amount threshold INJfail for determining failures. In other words, the ECU 11 determines that the level signal FL of the fuel level sensor 5 is in the empty dead zone ("YES" at A13), and sets the ΔINJPP[ppcnt] value (A14).

Specifically, when the fuel tank 1 is supplied with a small quantity of the fuel 2 at time tc2, the level signal FL is a value in the empty dead zone. In this case, the ECU 11 sets the maximum stored amount ΔINJempty as ΔINJPP[1]. The value of INJempty is a correction value determined in advance, representing the maximum stored amount of fuel in the empty dead zone. In other words, even if the fuel tank 1 is not actually completely empty when refueled, this maximum stored amount is still added to the correction amount, thus assuming that the fuel tank 1 was empty.

Accordingly, ΔINJPP[1] is the first correction value. The ECU 11 then adds the value of ΔINJPP[1] to the fuel consumption amount threshold INJfail (A17). As a result, the amount of time required for the fuel consumption amount INJsum value to reach the fuel consumption amount threshold INJfail is extended.

Next, when the fuel tank 2 is repeatedly supplied with a small quantity of the fuel 2 in a similar manner as above, the ECU 11 in response obtains ΔINJPP[2] at time tc3, while continuing to increase the fuel consumption amount INJsum value. After the refueling event at time tc3, the change amount ΔFL of the level signal FL reaches the predetermined value ΔFLpass at, for example, time tc4. At this time, the fuel consumption amount INJsum has not reached the fuel consumption amount threshold INJfail. As a result, the ECU 11 determines that the fuel level sensor 5 is operating normally. Then, the ECU 11 clears the total fuel consumption amount INJsum, and continues the failure diagnosis process.

In addition, since the ECU 11 has determined that the fuel level sensor 5 is operating normally, the next time that the diagnosis program is executed, one of the parameter initialization conditions is met ("YES" at A1). As a result, the fuel consumption amount threshold INJfail will be reset to the uncorrected value (A2).

Further, in the case the fuel level sensor 5 fails, a failure state will be detected at tc6 in the same manner as explained above with respect to FIG. 5. According to the above, when a small quantity of the fuel 2 is supplied while the fuel tank 1 is at or near empty, by correcting the fuel consumption amount threshold INJfail by a margin corresponding to the maximum stored amount $\Delta$INJempty, misdiagnoses may be avoided. As a result, an even more accurate diagnosis operation may be performed.

According to the above described first embodiment, when the fuel tank 1 is supplied with a small quantity of the fuel 2, the ECU 11 corrects the fuel consumption amount threshold INJfail according to a correction value. Therefore, even if small quantity refueling events are repeatedly performed and the fuel consumption amount INJsum is not reset, the fuel consumption amount INJsum will not exceed the threshold. In other words, even if the fuel consumption amount INJsum increases, a margin is ensured between the fuel consumption amount threshold INJfail and the fuel consumption amount INJsum. As such, it is possible to avoid misdiagnosing the fuel level sensor 5 as being faulty due to supplying a small quantity of the fuel 2 even though the fuel level sensor 5 is operating normally, and a more accurate failure diagnosis may be performed.

Further, according to the above embodiment, even if the level signal FL of the fuel level sensor 5 is in the full dead zone or the empty dead zone, a correction is performed accordingly, and an accurate failure diagnosis may be performed.

In addition, according to the above embodiment, the number of times that corrections may be repeated is limited. Accordingly, it is possible to avoid errors in the detection process itself due to excessive corrections.

(Second Embodiment)

Figure 8:
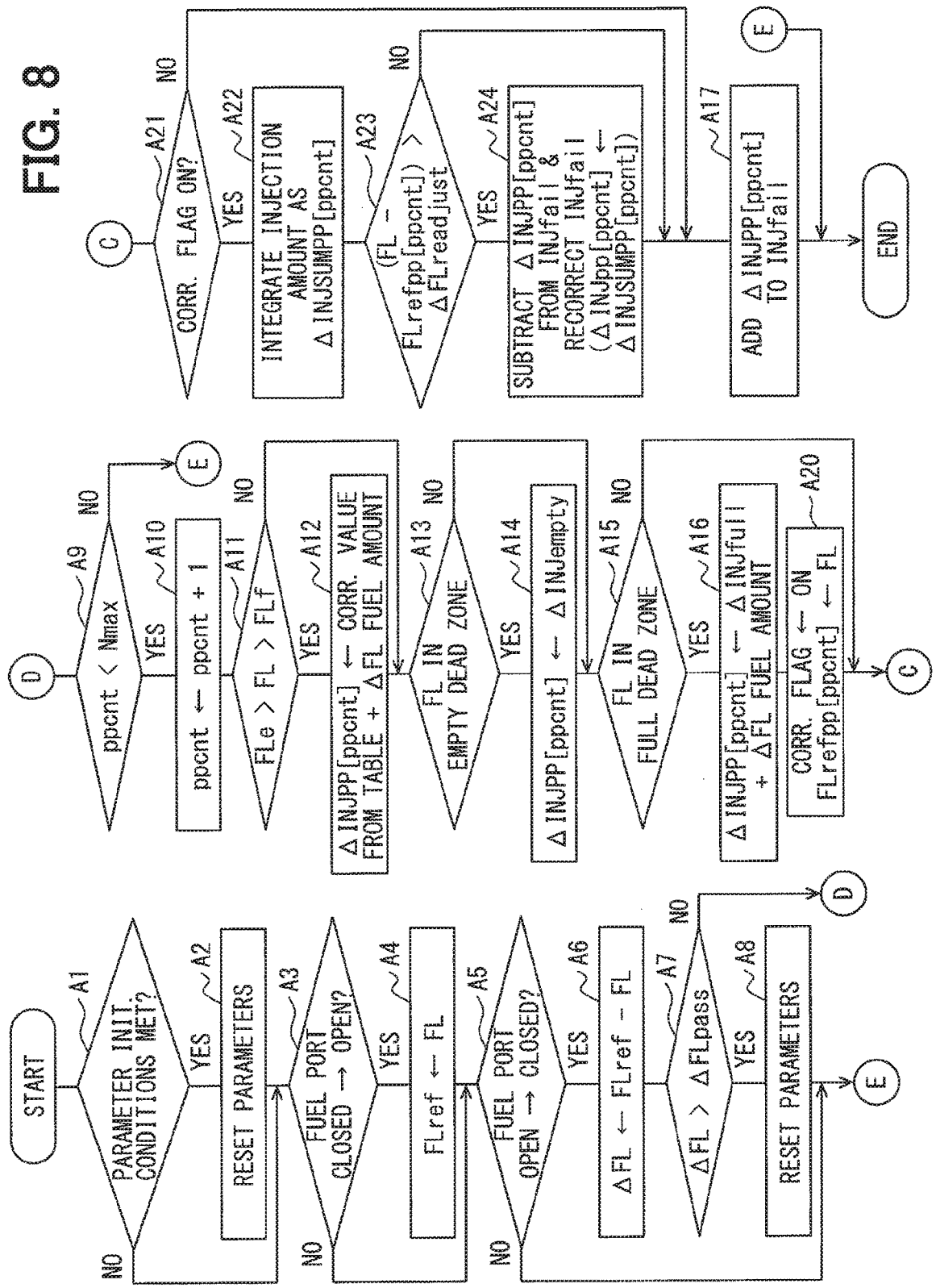
FIG. 8 is a flow chart of a failure diagnosis program for a fuel level sensor of a second embodiment.
Figure 9:
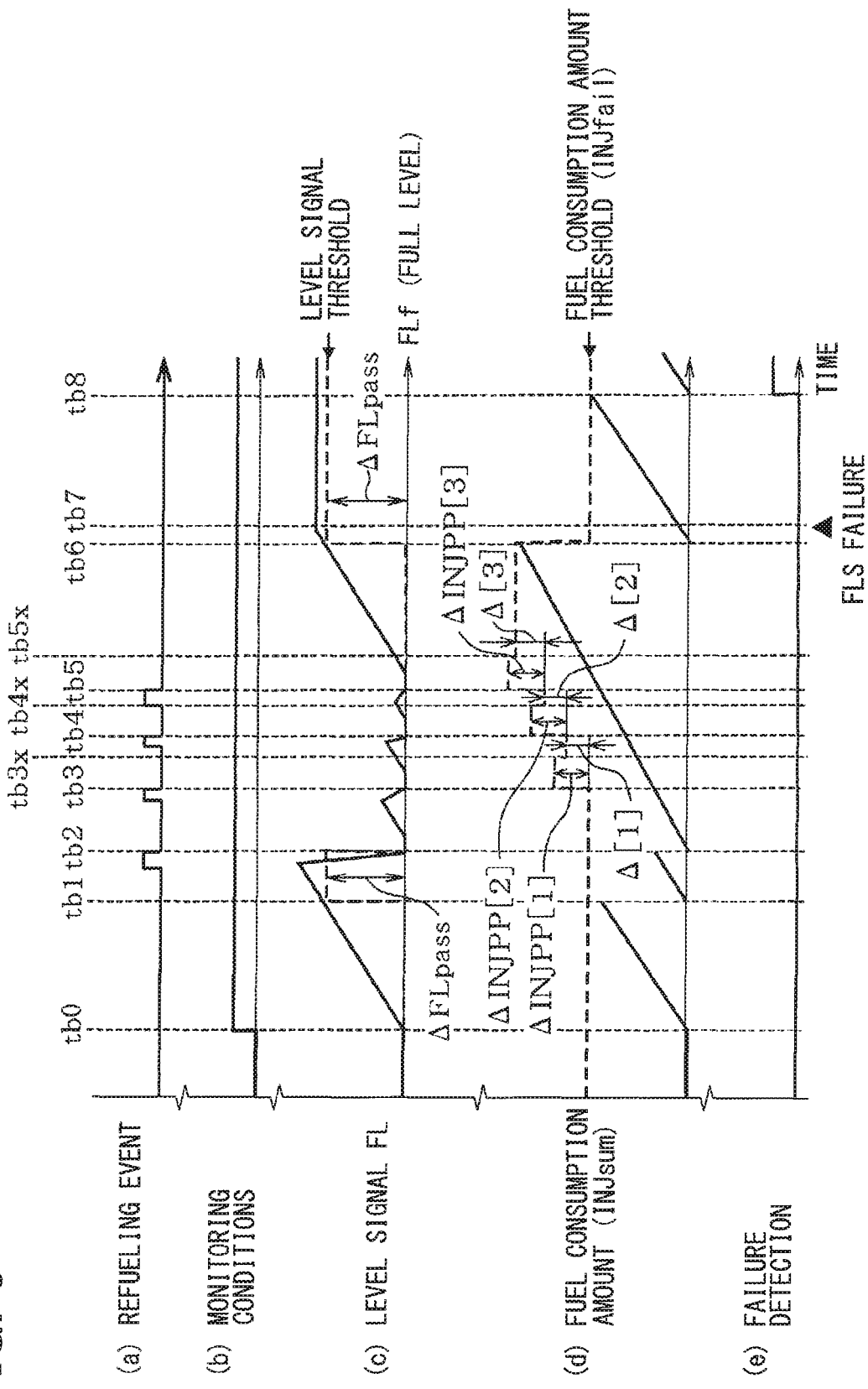
FIG. 9 is a time chart showing transitions of a fuel consumption amount, a level signal, and the like of a fuel level sensor when re-correcting for a small quantity refueling.

A second embodiment is shown in FIGS. 8 and 9, and the portions of which that are different from the first embodiment will be explained below. The present embodiment re-corrects the correction value used in the first embodiment when the fuel tank 1 is supplied with a small quantity of the fuel 2 in the case of the level signal FL being in the full dead zone. Specifically, in the first embodiment, when a small quantity refueling event occurs when the level signal FL of the fuel level sensor 5 is in the full dead zone, the maximum stored amount $\Delta$INJfull is added as a correction value. Further in the first embodiment, $\Delta$INJfull is a predetermined value.

Conversely, according to the present embodiment, the maximum stored amount $\Delta$INJfull of the full dead zone is first assumed to be greater than the actual supplied amount of fuel. Then, after first correcting with the assumed $\Delta$INJfull, a re-correction is performed based on the actual circumstances. Accordingly, even if refueling is repeatedly performed with small quantities of the fuel 2, it is possible to correct for the accumulation of errors between the actual supplied amounts and the correction values.

In FIG. 8, a re-correction process represented by steps A20 to A24 is added in the flowchart of FIG. 4 of the first embodiment. Specifically, step A20 is added immediately after step A16, and steps A21 to A24 are added immediately before step A17. In the same manner as the first embodiment, when the fuel tank 1 is supplied with a small quantity of the fuel 2, the ECU 11 performs a correction at steps A11 to A16. If the correction is performed for a small quantity refueling event in the full dead zone (i.e., by performing steps A15 and A16), then the ECU 11 sets a mid-correction flag to ON, and stores the level signal FL of the fuel level sensor 5 at the start time of correction as FLrefpp[ppcnt] (A20). In other words, if a correction is performed for a small quantity refueling event in the intermediate region or the empty dead zone, the mid-correction flag is not set to ON.

Next, the ECU 11 determines whether the mid-correction flag is ON, i.e., whether there is a correction request for a small quantity refueling of the fuel 2 (A21). If the mid-correction flag is ON ("YES" at A21), the ECU 11 integrates the fuel consumption amount during this time as a mid-correction fuel consumption amount $\Delta$INJSUMPP[ppcnt] (A22). Further, if "NO" is determined at step A21, the ECU 11 continues to step A17 as normal.

Next, the ECU 11 calculates a change amount $\Delta$FLpp as the amount that the signal FL has changed since the start of correction (i.e., level signal FL−FLrefpp[ppcnt]). In addition, the ECU 11 determines whether this change amount $\Delta$FLpp is greater than a predetermined value $\Delta$FLreadjust (A23). The predetermined value $\Delta$FLreadjust is, for example, set as a readable change amount such as detecting that the level signal FL has changed by a minute amount. As a result, the output range of the level signal FL is detected as moving out of the full dead zone and into the intermediate region.

Next, the ECU performs the following processing (A24) to ensure that the fuel consumption amount threshold INJfail is not over-corrected. Specifically, from the previous iteration of executing the program, the correction amount $\Delta$INJPP[ppcnt] was added to the fuel consumption amount threshold INJfail at step A17. Accordingly, at this time, the ECU 11 first subtracts the correction amount $\Delta$INJPP[ppcnt] from the fuel consumption amount threshold INJfail. As a result, the fuel consumption amount threshold INJfail is returned to its original value. Next, the ECU replaces the previous correction amount $\Delta$INJPP[ppcnt] of the fuel consumption amount threshold value with the fuel consumption amount $\Delta$INJSUMPP[ppcnt], which corresponds to the actual consumed amount of fuel (A24). Accordingly, by using the actual amount of fuel consumed while the level signal FL remained in the full dead zone, the actual supplied amount may be approximated.

Further, similar to before, if "NO" is determined at step A23, the ECU 11 performs step A17 and terminates the program. In addition, if the ECU 11 performed step A24, then at step A17, the ECU 11 adds the correction value $\Delta$INJPP[ppcnt] for a small quantity refueling which was re-corrected at step A24 to the fuel consumption amount threshold INJfail, and after this re-correction process, terminates the program.

FIG. 9 shows a specific example of the re-correction process described above. Here, the level signal FL of the fuel level sensor 5 is shown as being in the full dead zone (corresponding to FIG. 6 of the first embodiment). As described previously, when a small quantity refueling event is performed in the full dead zone, the maximum stored amount $\Delta$INJfull is used as the correction value, and this correction value may be greater than the actual supplied amount.

In this regard, according to the present embodiment, the first correction value ΔINJPP[1] is set by the ECU 11 performing the step A16 in the same manner as the first embodiment. Next, when "YES" is determined by the ECU 11 at step A23 at time tb3x, the ECU 11 replaces the correction value ΔINJPP[1] with the fuel consumption amount ΔINJSUMPP[1] to re-correct to an accurate value. Further, in FIG. 9, the re-corrected correction value is shown as Δ[1] for simplicity. Next, the ECU 11 adds the re-corrected value Δ[1] to the fuel consumption amount threshold INJfail (A17). As a result, the amount of time required for the fuel consumption amount INJsum value to reach the fuel consumption amount threshold INJfail is extended.

Next, if the fuel tank 1 is repeatedly refueled with a small quantity of the fuel 2 while near full, then in a similarly the ECU 11 obtains ΔINJPP[2] as a correction value at time tb4, then calculates a re-corrected value Δ[2] at time tb4x and performs the correction. Further, the ECU 11 obtains ΔINJPP[3] as a correction value at time tb5, then calculates a re-corrected value Δ[3] at time tb5x and performs the correction.

According to the second embodiment as described above, the ECU 11 uses a re-corrected value to perform a re-correction such that a previously corrected fuel consumption amount threshold INJfail is optimized to a fuel consumption amount threshold INJfail appropriate for a small supplied amount of the fuel 2. As a result, the diagnosis may be performed accurately and frequently.

(Third Embodiment)

Figure 10:
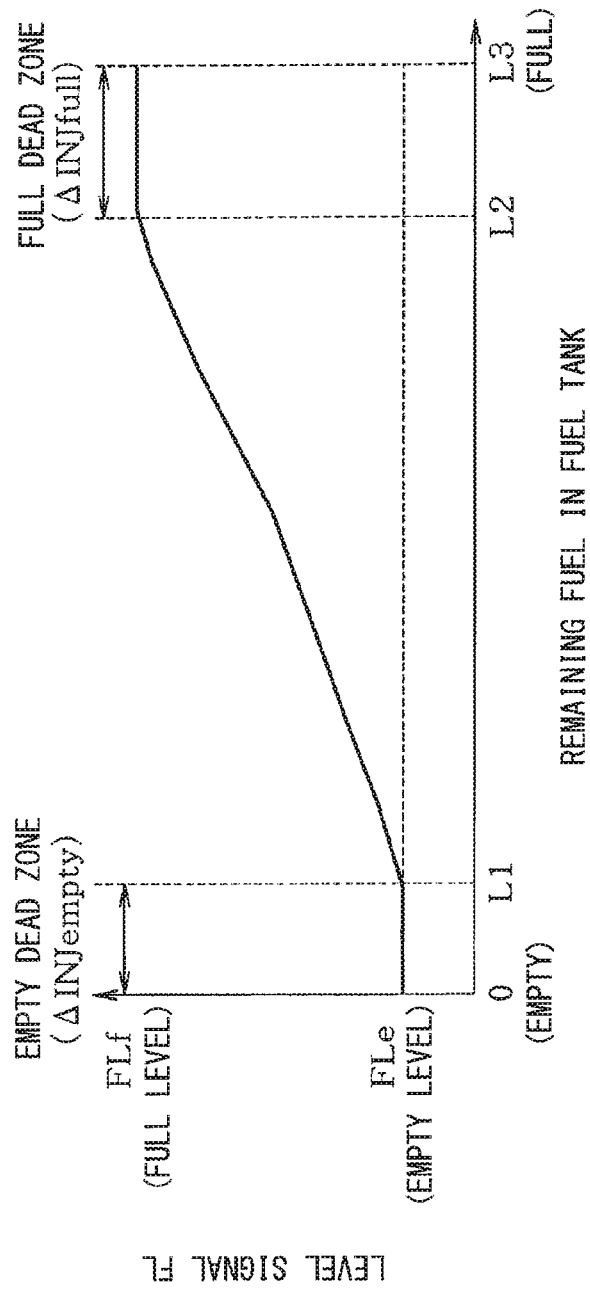
FIG. 10 shows a relationship between a level signal of a fuel level sensor and a remaining quantity of fuel in a fuel tank for a third embodiment.
Figure 11:
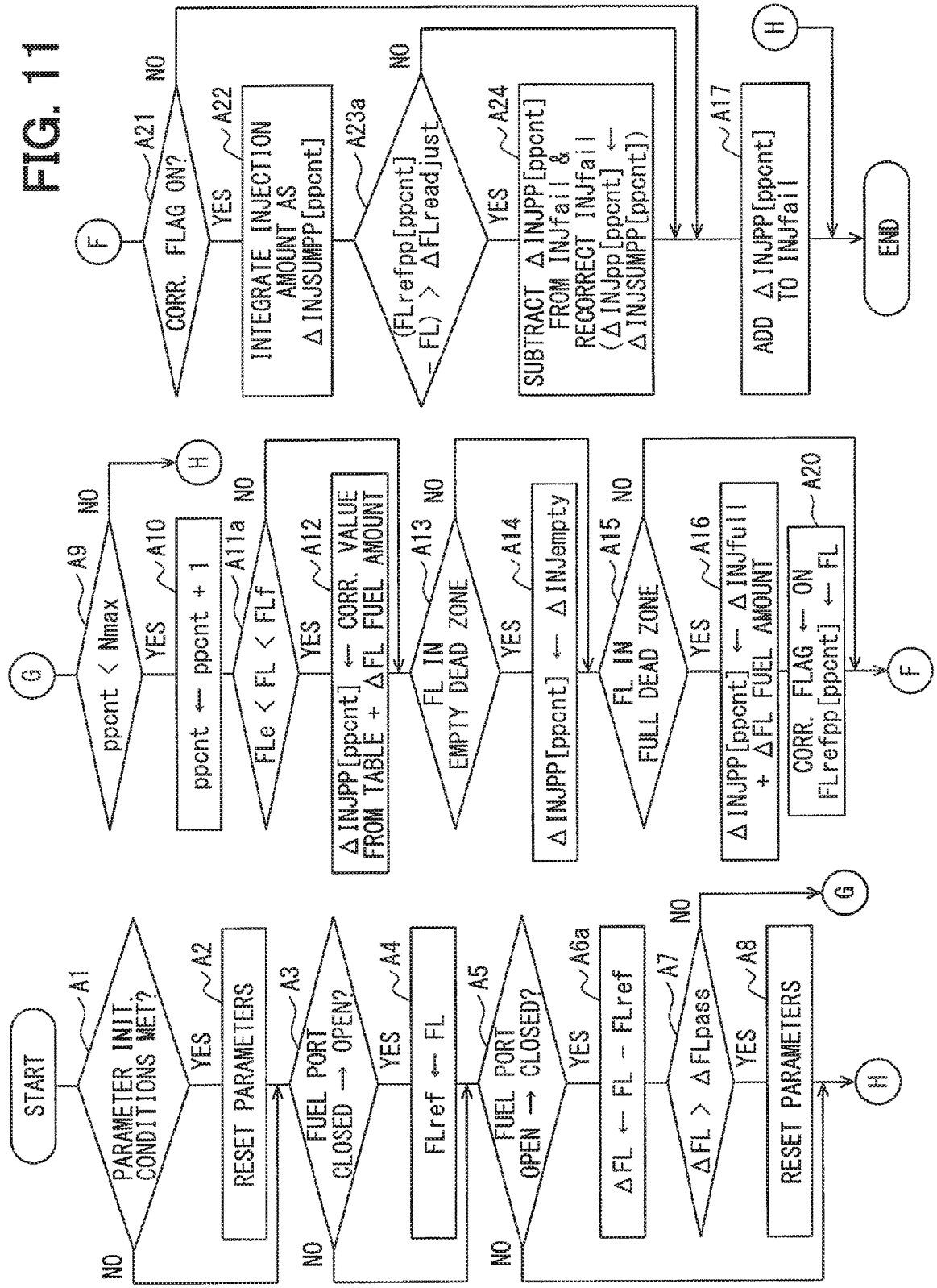
FIG. 11 is a flow chart of a failure diagnosis program for a fuel level sensor.
Figure 12:
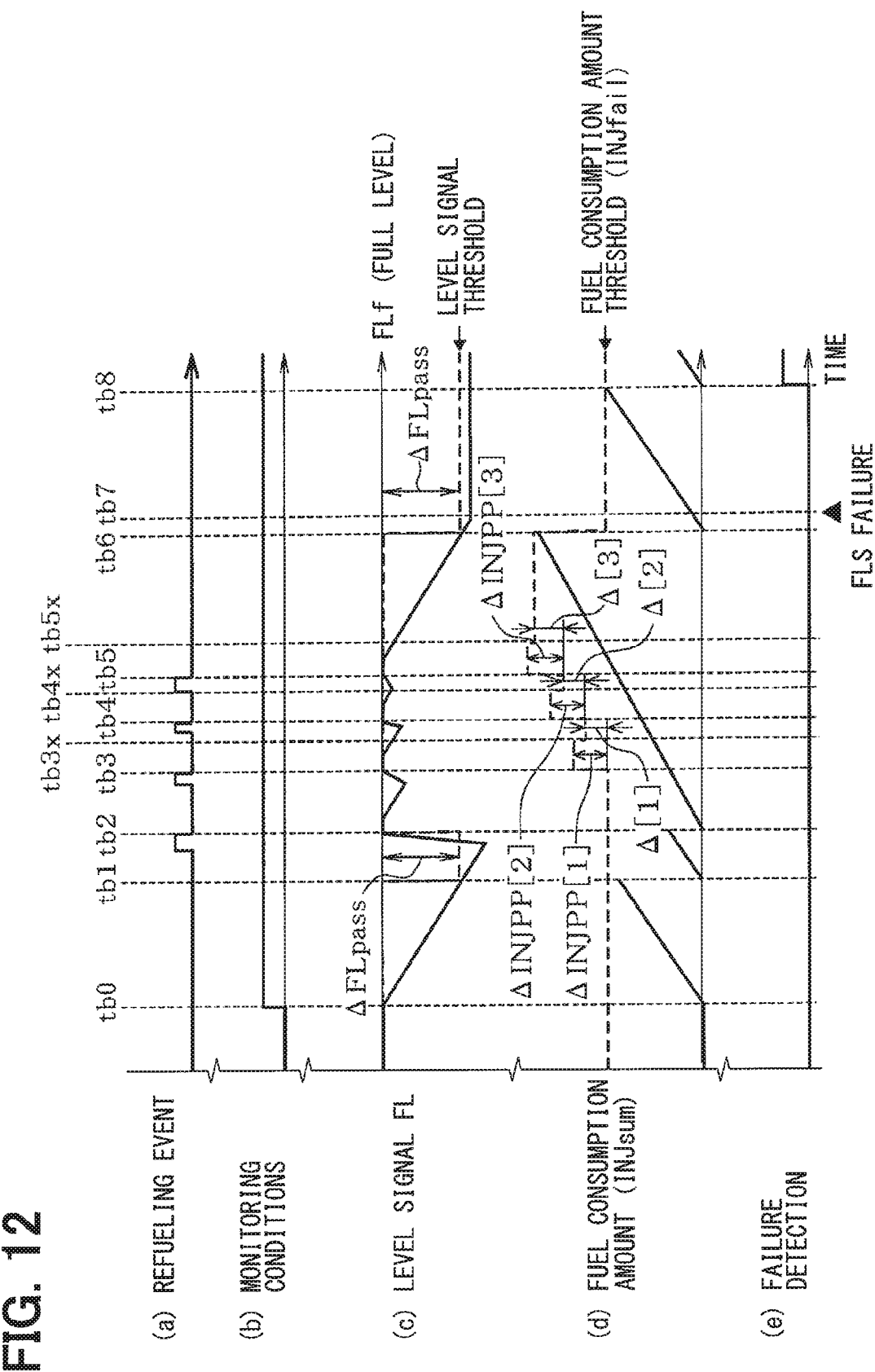
FIG. 12 is a time chart showing transitions of a fuel consumption amount, a level signal, and the like of a fuel level sensor when re-correcting for a small quantity refueling.

FIGS. 10 to 12 show a third embodiment, and the portions of which that are different from the second embodiment will be explained below. In the present embodiment, the level signal FL of the fuel level sensor 5 is output as a signal that is approximately proportional to the remaining fuel 2 in the fuel tank 1.

FIG. 10 shows a relationship between the level signal FL of the fuel level sensor 5 and the remaining quantity of the fuel 2 in the fuel tank 1. As shown in FIG. 10, as the amount of fuel 2 in the fuel tank 1 decreases, the level signal FL of the fuel level sensor 5 outputs a smaller value signal. The empty dead zone lies between when the fuel 2 is "empty" and L1, and thus the level signal FL of the fuel level sensor 5 is at a constant level here. Next, as the remaining amount of fuel 2 increases, the level signal FL also increases in an approximately proportional relationship. Then, in the full dead zone between L2 and the fuel 2 being "full", the level signal FL is once again at a constant level.

In this case, depending on the shape of the fuel tank 1 or devices positioned within the fuel tank 1, the relationship between the level signal FL and the remaining amount of the fuel 2 may not maintain a constant proportional relationship. In other words, in FIG. 10 as well, the line representing the relationship between the remaining amount of the fuel 2 and the level signal FL bends such that its slope changes in an intermediate region.

FIG. 11 is a flowchart that shows a failure diagnosis program when using a fuel level sensor 5 having the characteristics shown in FIG. 10. During this failure diagnosis process, the ECU 11 performs substantially the same processing as the first and second embodiments. However, for determining the output level of the level signal FL of the fuel level sensor, steps A6, A11, and A23 are replaced with stops A6a, A11a, and A23a in the processing of FIG. 11.

Specifically, at step A6a, the ECU 11 subtracts FLref from the level signal FL to calculate the change amount ΔFL of the level signal FL (ΔFL=level signal FL−FLref). Further, when determining whether the level signal FL is in the intermediate region at step A11a, the ECU 11 reverses the size comparisons, i.e., uses a reverse inequality equation (FLe<FL<FLf). In addition, at step A23a, the ECU 11 calculates the change amount ΔFLpp by subtracting the level signal FL at the start time of correction (FLrefpp[ppcnt]−level signal FL), and then determines whether this change amount ΔFLpp is above the predetermined value ΔFLreadjust.

FIG. 12 shows a specific example of when the level signal FL of the fuel level sensor 5 is in the full dead zone. The specific process is substantially the same as that of the second embodiment. Further, in FIG. 12, aside from the up-down directionality of the waveform of the level signal FL, substantially the same effects may be obtained.

Thus, according to the third embodiment as well, aside from the above differences, assuming that the relationship with the level signal LF is reversed, the ECU 11 performs a process with substantially the same intention as those of the first and second embodiments, and may obtain the same operational effects.

(Fourth Embodiment)

Figure 13:
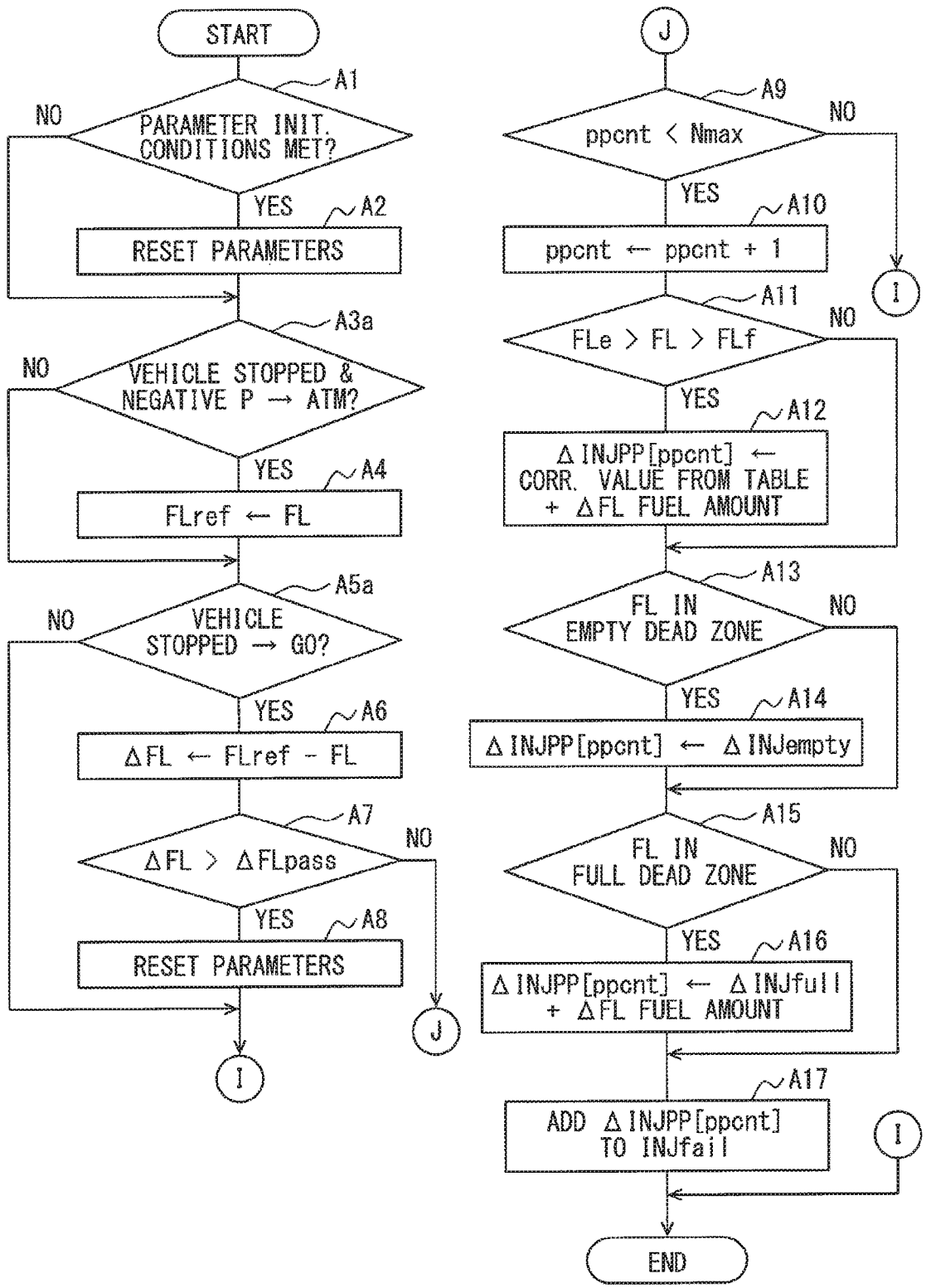
FIG. 13 is a flow chart of a failure diagnosis program for a fuel level sensor of a fourth embodiment.

FIG. 13 shows a fourth embodiment, which differs from the first embodiment in that the opening and closing sensor 4 is not disposed in the fuel tank 1, and therefore the opening and closing of the cap 3 cannot be directly detected. However, refueling may be determined from other existing structures.

Specifically, as shown in the first embodiment, the internal pressure sensor 6 is disposed in the fuel tank 1, and the vehicle speed sensor 12 is provided to determine the traveling state of the vehicle. In the present embodiment, these the signals obtained from these elements are used to determine refueling events.

FIG. 13 shows a correction process performed by the ECU 11 that is substantially the same as that of the first embodiment. However, steps A3 and A5 which detect the opening and closing of the fuel tank 1 are replaced with steps A3a and A5a.

The internal space of the fuel tank 1 normally has a negative pressure, but changes to atmospheric pressure when the cap 3 is opened for refueling. This phenomenon is used as a condition for detecting the opening and closing of the fuel tank 1. Further, as a condition for refueling the fuel tank 1 with the fuel 2, the vehicle is stopped. In this case, the ECU 11 is able to determine whether the vehicle is stopped from the signal of the vehicle speed sensor 12. Accordingly, at step A3a, by determining that the vehicle speed is zero (i.e., the vehicle is stopped) and by detecting a change from negative pressure to atmospheric pressure with the internal pressure sensor 6, the ECU 11 may determine the start of refueling of the fuel tank 1.

Further, after the cap 3 of the fuel tank 1 is closed, the internal pressure changes slowly. However, by at least detecting using the vehicle speed sensor that the vehicle is traveling, it is possible to estimate when the cap 3 is closed. Accordingly, at step A5a, the ECU 11 obtains a detection signal from the vehicle speed sensor that the vehicle has changed from a stopped state to a traveling state, and thus the ECU 11 is able to determine when the cap 3 of the fuel tank 1 is closed.

In addition, when the ECU 11 determines the end of the refueling event at step A5a, the actual timing of closing the cap 3 cannot be detected. However, in practice, all fuel is consumed when the vehicle is traveling. Accordingly, there is not a large error when determining the end of the refueling event in this manner.

According to the fourth embodiment as well, in place of the opening and closing sensor 4 of the fuel tank 1, refueling events may be determined using the internal pressure sensor 6 and the vehicle speed sensor 12, and the same operational effects as the first embodiment may be obtained.

In addition, the above embodiment may be applied to the second and third embodiments as well.

(Other Embodiments)

The present disclosure is not limited to the above described embodiments, and a variety of modifications which do not depart from the gist of the present disclosure are contemplated. For example, the present disclosure may extend to the following modifications.

As long as the relationship between the level signal FL of the fuel level sensor 5 and the remaining quantity of fuel 2 in the fuel tank 1 is roughly proportional, the characteristics line thereof may have several slope changes at intermediate regions, or no slope changes.

In the first embodiment, the maximum consecutive correction count Nmax is set to 3 times, but this may be set to another appropriate number, or there may be no upper limit set.

The invention claimed is:

1. A fuel level sensor diagnosis device for receiving a fuel level signal from a fuel level sensor that detects a remaining quantity of fuel in a fuel tank and for determining a failure in the fuel level sensor, comprising:
    a fuel consumption integrator that integrates a fuel consumption amount signal representing a consumed amount of fuel of the fuel tank;
    a determination unit that determines a failure in the fuel level sensor when a total fuel consumption amount from the fuel consumption integrator exceeds a failure threshold value;
    an integrated value reset unit that resets the total fuel consumption amount when a change amount of the fuel level signal exceeds a predetermined reset threshold value; and
    a correction unit that, when the change amount of the fuel level signal does not exceed the reset threshold value when the fuel tank is supplied with fuel, determines a small quantity refueling and corrects the failure threshold value of the determination unit.

2. The fuel level sensor diagnosis device of claim 1, wherein
    the correction unit is configured to not correct the failure threshold value when the small quantity refueling occurs a predetermine number of times consecutively.

3. The fuel level sensor diagnosis device of claim 1, wherein
    when the fuel level signal is in a full state or an empty state at the time of determining the small quantity refueling, the correction unit is configured to correct the failure threshold value with a dead zone correction value.

4. The fuel level sensor diagnosis device of claim 1, wherein
    upon detecting the small quantity refueling and correcting the failure threshold value, the correction unit separately integrates the fuel consumption amount from the fuel consumption integrator as a correction sum, and when the change amount of the fuel level signal exceeds a re-correction threshold value, the correction unit re-corrects the failure threshold value with the correction sum.

5. The fuel level sensor diagnosis device of claim 1, wherein
    the correction unit is configured to determine that the fuel tank is supplied with fuel when a detection signal from an opening and closing sensor transitions from open to closed, the opening and closing sensor being disposed in a fuel supply port of the fuel tank.

6. The fuel level sensor diagnosis device of claim 1, wherein
    the correction unit is configured to determine that the fuel tank is supplied with fuel when a detection signal from a pressure sensor transitions from increasing to an atmospheric pressure to decreasing toward or below the atmospheric pressure, the pressure sensor detecting an internal pressure of the fuel tank.

* * * * *